United States Patent
Voice et al.

(10) Patent No.: US 12,480,433 B2
(45) Date of Patent: Nov. 25, 2025

(54) ACTIVE HYDROCARBON TRAP FOR REDUCTION OF EMISSIONS FROM INTERNAL COMBUSTION ENGINES USING A FOUR VALVE CONFIGURATION

(71) Applicant: ARAMCO SERVICES COMPANY, Houston, TX (US)

(72) Inventors: Alexander Voice, Detroit, MI (US); Kaustav Bhadra, Ann Arbor, MI (US); Esam Hamad, Brighton, MI (US); Praveen Kumar, New Hudson, MI (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 18/390,737

(22) Filed: Dec. 20, 2023

(65) Prior Publication Data
US 2025/0207522 A1    Jun. 26, 2025

(51) Int. Cl.
*F01N 3/28* (2006.01)
*F01N 3/08* (2006.01)
(Continued)

(52) U.S. Cl.
CPC ......... *F01N 3/2882* (2013.01); *F01N 3/0814* (2013.01); *F01N 13/011* (2014.06); *F01N 13/02* (2013.01)

(58) Field of Classification Search
CPC ...... F01N 2240/02; F01N 3/0835; F01N 5/02; F01N 9/00; F01N 2570/12; F01N 13/009;
(Continued)

(56) References Cited

U.S. PATENT DOCUMENTS 3,757,521 A    9/1973  Tourtellotte et al.
4,478,808 A *  10/1984 Matros ................... C01B 17/78
                                                423/DIG. 6
(Continued)

FOREIGN PATENT DOCUMENTS

CN    105221221 A    1/2016
CN    105952516 A    9/2016

OTHER PUBLICATIONS

U.S. Office Action Issued in Related U.S. Appl. No. 18/390,770 Mailed on Apr. 10, 2024, 25 pages.
(Continued)

*Primary Examiner* — Anthony Ayala Delgado
(74) *Attorney, Agent, or Firm* — Osha Bergman Watanabe & Burton LLP

(57) ABSTRACT

A device for reducing emissions from an internal combustion engine having a close-coupled catalyst including an underbody catalyst and a hydrocarbon trap disposed downstream of the close-coupled catalyst. The device includes a heat exchanger and a liquid water knockout disposed downstream of the close-coupled catalyst. The device includes a four-valve system configured to dynamically adjust a flow path of exhaust from the internal combustion engine through the underbody catalyst, hydrocarbon trap, or both, to reduce emissions. A method for reducing emissions including feeding an exhaust gas from the internal combustion engine to the close-coupled catalyst, producing a catalyzed exhaust gas. The method includes flowing the catalyzed exhaust gas from the close-coupled catalyst to the four-valve system.

20 Claims, 3 Drawing Sheets

(51) Int. Cl.
*F01N 13/00* (2010.01)
*F01N 13/02* (2010.01)

(58) Field of Classification Search
CPC ............. F01N 2410/12; F01N 2240/36; F01N 2260/02; F01N 2550/06; F01N 2240/18; F01N 2470/18; F01N 3/2892; F01N 3/101; F01N 2550/03; F01N 1/166; F01N 1/168; F01N 3/0871; F01N 3/0234; F01N 2240/20; F01N 3/2053; F01N 2390/00; F01N 3/0878
See application file for complete search history.

(56) References Cited

U.S. PATENT DOCUMENTS

| | | | | |
|---|---|---|---|---|
| 5,125,231 | A | * | 6/1992 | Patil ................ F01N 13/009 422/171 |
| 5,142,864 | A | | 9/1992 | Dunne |
| 5,192,021 | A | * | 3/1993 | Meier ................ B60H 1/20 237/12.3 B |
| 5,260,035 | A | | 11/1993 | Lachman et al. |
| 5,307,627 | A | | 5/1994 | Christensen et al. |
| 5,524,433 | A | | 6/1996 | Adamczyk, Jr. et al. |
| 5,613,359 | A | | 3/1997 | Zahn et al. |
| 5,647,206 | A | | 7/1997 | Yamamoto et al. |
| 5,768,888 | A | * | 6/1998 | Matros ................ F01N 3/20 60/296 |
| 6,029,443 | A | | 2/2000 | Hirota et al. |
| 6,074,973 | A | | 6/2000 | Lampert et al. |
| 6,347,511 | B1 | | 2/2002 | Haines |
| RE42,156 | E | * | 2/2011 | Hirota ................ F01N 13/009 60/287 |
| 11,028,758 | B2 | * | 6/2021 | Geyer ................ F01N 13/011 |
| 11,187,124 | B2 | * | 11/2021 | Hamad ............. B01D 53/9495 |
| 11,525,377 | B1 | | 12/2022 | Hwang |
| 11,686,236 | B1 | | 6/2023 | Laigle et al. |
| 11,852,063 | B1 | * | 12/2023 | Khaled ................ F01N 3/101 |
| 2006/0242947 | A1 | | 11/2006 | Kay et al. |
| 2007/0180817 | A1 | | 8/2007 | Yamashita et al. |
| 2008/0078165 | A1 | * | 4/2008 | Kim ................ F01N 13/02 60/299 |
| 2008/0289321 | A1 | * | 11/2008 | Lu ................ F01N 3/0878 60/299 |
| 2010/0199635 | A1 | | 8/2010 | Akama et al. |
| 2010/0205939 | A1 | | 8/2010 | Sano et al. |
| 2012/0000182 | A1 | | 1/2012 | Gonze et al. |
| 2015/0132188 | A1 | * | 5/2015 | Howard ................ F01N 3/0821 422/171 |
| 2018/0179943 | A1 | | 6/2018 | Oya et al. |
| 2020/0408132 | A1 | | 12/2020 | Lupescu et al. |
| 2021/0207511 | A1 | * | 7/2021 | Hamad ................ F01N 3/0814 |
| 2022/0195914 | A1 | | 6/2022 | Raffelsberger et al. |
| 2023/0193797 | A1 | * | 6/2023 | Laigle ................ B01D 53/94 423/210 |

OTHER PUBLICATIONS

U.S. Office Action Issued in Related U.S. Appl. No. 18/390,815 Mailed on Apr. 10, 2024, 22 pages.
J. Lupescu, et al., "A New Catalyzed HC Trap Technology that Enhances the Conversion of Gasoline Fuel Cold-Start Emissions", SAE International Journal of Fuels and Lubricants, 2018, vol. 11, No. 4, pp. 411-425 (16 pages).
J. Lupescu, et al., "Passive Hydrocarbon Trap to Enable SULEV-30 Tailpipe Emissions from a Flex-Fuel Vehicle on E85 Fuel", SAE International Journal of Fuels and Lubricants, 2018, vol. 11, No. 4, pp. 427-441 (14 pages).
S. Yamamoto, et al., "In-line Hydrocarbon (HC) Adsorber System for Reducing Cold-Start Emissions", SAE Technical Paper 2000-01-0892, SAE 2000 World Congress, Detroit, Michigan, Mar. 6-9, 2000 (11 pages).
J. Nunan, et al., "HC Traps for Gasoline and Ethanol Applications", SAE International Journal of Fuels and Lubricants, 2013, vol. 6, No. 2, pp. 430-449 (20 pages).
Y. Endo, et al., "Development of Highly Durable Zeolites as Hydrocarbon Trap Materials for Automotive Catalysts", SAE Technical Paper Series, 2018 (10 pages).
K. N. Rao, et al., "Cold-Start Hydrocarbon Speciation and Trap Materials for Gasoline Engines", SAE Technical Paper Series, 2018 (8 pages).
L. Xu, et al., "Benefits of Pd Doped Zeolites for Cold Start HC/NOx Emission Reductions for Gasoline and E85 Fueled Vehicles", SAE International Journal of Fuels and Lubricants, 2018, vol. 11, No. 4, pp. 301-317 (16 pages).
Final Office Action issued by the U.S. Patent Office for corresponding U.S. Appl. No. 18/390,815, mailed Jun. 23, 2025 (17 pages).
The Non-Final Office Action issued by the U.S. Patent Office for corresponding U.S. Appl. No. 18/390,815, mailed Mar. 13, 2025 (21 pages).

* cited by examiner

ACTIVE HYDROCARBON TRAP FOR REDUCTION OF EMISSIONS FROM INTERNAL COMBUSTION ENGINES USING A FOUR VALVE CONFIGURATION

BACKGROUND

Internal combustion engines emit gaseous pollutants such as carbon monoxide (CO), carbon dioxide ($CO_2$), unburned hydrocarbons, nitrogen oxide ($NO_x$) as well as solid pollutants such as particulate matter. As legislation has tightened the rules for vehicle emissions, new exhaust purification systems have been developed to reduce emissions. Most of the exhaust lines for internal combustion engines include one or more catalysts to reduce gaseous pollutants. Environmental concerns and government regulations have led to efforts focused on improving the removal of combustion by-products and exhaust pollutants from vehicle engine exhaust gases. Common exhaust lines are equipped with several components in order to reduce pollutants from the high concentrations observed directly from the engine to low concentrations at the tailpipe.

A large portion of the exhaust emissions are produced during the cold start phase, resulting from the low conversion efficiency of many exhaust gas purifying catalysts in cold engine conditions. As such, catalysts are often heated during the cold start phase to increase pollutant conversion and reduce noxious emissions. Nevertheless, under cold start conditions, residual pollutants often remain, making the removal of such pollutants a highly desirable goal.

Accordingly, there exists a need for a system to reduce emissions from internal combustion engines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a device for reducing emissions from an internal combustion engine having a close-coupled catalyst with an underbody catalyst and a hydrocarbon trap disposed downstream of the close-coupled catalyst. The device includes a heat exchanger and a liquid water knockout disposed downstream of the close-coupled catalyst. The device includes a four-valve system configured to dynamically adjust a flow path of exhaust from the internal combustion engine through the underbody catalyst, hydrocarbon trap, or both, to reduce emissions.

In another aspect, embodiments disclosed herein relate to a method for reducing emissions using a system including an underbody catalyst and hydrocarbon trap disposed downstream of the close-coupled catalyst. The system includes a heat exchanger and a liquid water knockout disposed downstream of the close-coupled catalyst. The system includes a four-valve system configured to dynamically adjust a flow path of exhaust from the internal combustion engine through the underbody catalyst, hydrocarbon trap, or both, to reduce emissions. The method for reducing emissions using this system includes feeding an exhaust gas from the internal combustion engine to the close-coupled catalyst, producing a catalyzed exhaust gas. The method includes flowing the catalyzed exhaust gas from the close-coupled catalyst to the four-valve system.

Other aspects and advantages of the claimed subject matter will be apparent from the following description and the appended claims.

DETAILED DESCRIPTION

Figure 1:
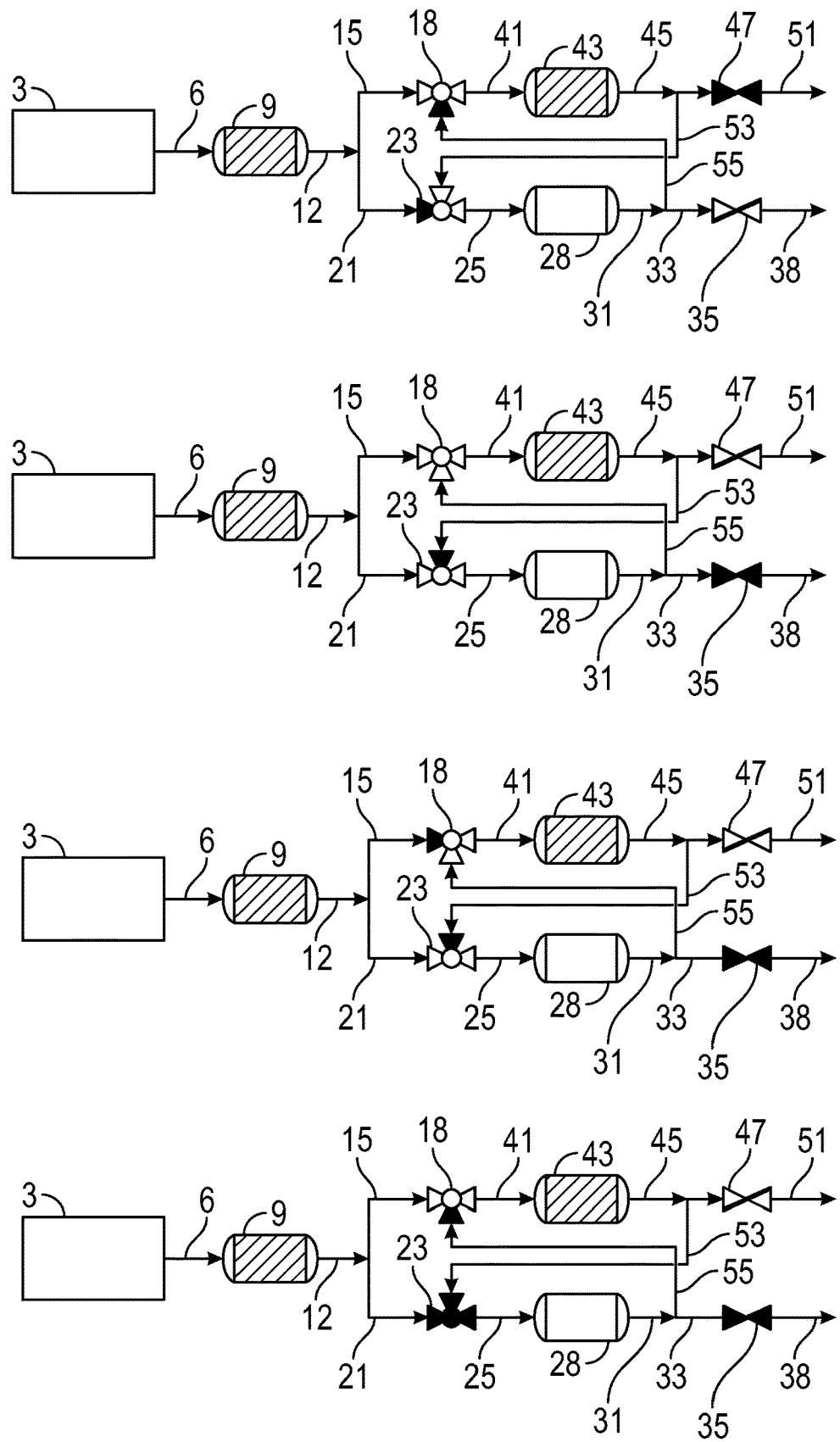
FIG. 1 is a diagram of a four-valve system for reducing emissions from an internal combustion engine having a close-coupled catalyst in accordance with one or more embodiments.

In one aspect, embodiments disclosed herein relate to a system for reducing emissions from an internal combustion engine containing a close-coupled catalyst, an underbody catalyst, and a separate hydrocarbon trap in a four-valve system. In another aspect, embodiments disclosed herein relate to a system for reducing emissions from an internal combustion engine containing a close-coupled catalyst, an underbody catalyst, and a separate hydrocarbon trap in a three-valve system. In another aspect, embodiments disclosed herein relate to a system for reducing emissions from an internal combustion engine containing a close-coupled catalyst, an underbody catalyst, and a separate hydrocarbon trap in a two-valve system. In another aspect, embodiments disclosed herein relate to a system for reducing emissions from an internal combustion engine containing a close-coupled catalyst, an electrically-heated catalyst, and a separate hydrocarbon trap in a valve-less system.

The various conditions for each system may allow for different flow pathways to remove pollutants from the exhaust gas of the internal combustion engine during cold start, normal fully-heated hot operational conditions, and the warm phases in between. Cold start refers to the time directly after the vehicle engine is started when it is cold and has not been in use. At the very beginning of a cold start, the engine exhaust has a temperature matching that of the ambient temperature, which may be in the range of −25 to 35° C. depending on where the vehicle is parked. The heat generated from the combustion process in the engine heats up the surroundings and the enthalpy from the exhaust line heats up the components of the system that are present downstream of the engine. Over time, as the engine is warming up, the engine transitions to a warm engine condition (having an engine exhaust temperature in the range of 125 to 175° C.), warmer (having an engine exhaust temperature in the range of 175 to 350° C.), and finally a hot engine condition (having an engine exhaust temperature above 350° C.). Each system has at least two modes and some may have more depending on their system architecture. The engine emissions may also be referred to as exhaust gases.

Each system may include an internal combustion engine with a flow line flowing exhaust gas to a close-coupled catalyst which is then connected to a flow line leading into the various unique systems. In all systems, the exhaust gas may pass through a heat exchanger, a liquid knockout, or both of these process units downstream of the hydrocarbon trap.

In all systems, the heat exchanger may operate in a heating or a cooling mode. In some embodiments, the heat exchanger may be a cross flow type heat exchanger using ambient air and exhaust gases as the fluids passing through the exchanger. In the heating mode, the heat exchanger may maintain the exhaust gas above the dew point to prevent liquid condensation in the line that may reduce the performance of the hydrocarbon trap. In the heating mode, the heat exchanger may heat the exhaust gas to a temperature between 6° and 150° C. such that it is above the dew point of water vapor. In the cooling mode, the heat exchanger may further cool the exhaust gas in order to enhance the performance of the hydrocarbon trap. At gas temperatures above 150° C., the hydrocarbon trap begins to desorb the trapped hydrocarbons, which is not desirable until after the underbody catalyst downstream of the trap has achieved catalyst light off. In the cooling mode, the heat exchanger may cool the exhaust gas to a temperature between 10° and 150° C. In all systems, the liquid knockout may address the formation of liquid condensation in the line should it occur. These process units may be present individually or act in conjunction to optimize the performance of the system.

FIG. 1 shows a four-valve system for reducing emissions from an internal combustion engine. The four-valve system may include a close-coupled catalyst 9 receiving an exhaust gas 6 from an internal combustion engine 3. The engine may also include a heat exchanger, a liquid knockout, or both, downstream of the hydrocarbon trap 28 and the exhaust gas may pass through the heat exchanger, the liquid knockout, or both.

The four-valve system may operate during a period of time corresponding to cold, warm, warmer, and hot engine conditions. The first period of time corresponding to a cold engine condition refers to the system when the exhaust gas at the hydrocarbon trap is below 125° C. During the first period of time corresponding to the cold engine condition, the exhaust gas flows through the underbody catalyst and proceeds through the hydrocarbon trap to warm up the underbody catalyst while the hydrocarbon trap is adsorbing hydrocarbons before the underbody catalyst has reached light-off temperature. Light-off temperature is the temperature at which conversion reaches 50% for a specific catalyst. The second period of time corresponding to a warm engine condition refers to the system when the temperature of the exhaust gas is between 125 and 175° C. During the second period of time corresponding to the warm engine condition, the exhaust gas splits between the hydrocarbon trap and the underbody catalyst allowing the hydrocarbon trap to begin desorbing the adsorbed hydrocarbons while maintaining sufficient flow to the underbody catalyst to keep it warm and highly efficient. The third period of time corresponding to a warmer engine condition refers to the system when the temperature of the exhaust gas is between 175 and 350° C. During the third period of time corresponding to the warmer engine condition, the exhaust gas flows through the hydrocarbon trap to desorb the previously adsorbed hydrocarbons and pass them through the underbody catalyst to oxidize them to complete combustion products. The fourth period of time corresponding to a hot engine condition hot engine refers to the system when the temperature of the exhaust gas is above 350° C. The fourth period of time corresponding to the hot engine condition represents the conventional flow path of a production vehicle by bypassing the hydrocarbon trap once the hydrocarbon trap has fully desorbed the hydrocarbons, allowing the exhaust gas to flow directly to the underbody catalyst.

Referring to FIG. 1, during the first period of time corresponding to the cold engine condition, a control system operates a first valve 18, a second valve 47, a third valve 23, and a fourth valve 35 such that the fourth valve 35 is placed in the open position. The first valve 18 is a 3-way valve that may be opened in a first position to allow exhaust emissions to flow from the engine through to the underbody catalyst. In the first position, a secondary inlet from flow line 55 is closed off. The second valve 47 is placed in the closed position. During the first period of time corresponding to the cold condition, the catalyzed exhaust gas exiting the close-coupled catalyst 9 flows through a first flow line 12 from the close-coupled catalyst 9 to an underbody catalyst 43, with the first valve 18 disposed in this first flow line. The first flow line is broken up into two segments, a first segment before the first valve 15 and a second segment 41 after the first valve leading into the underbody catalyst 43. When the first valve 18 is in the first position, the emissions flow through the second segment 41 of the first flow line to the underbody catalyst 43. Still during the first period of time corresponding to the cold engine condition, the cold underbody catalyst effluent exiting the underbody catalyst 43 travels through a second flow line 45 leading to an ambient environment 51 with a second valve 47 disposed in the flow line, however, this cold underbody catalyst effluent is diverted through a line 53 intersecting the second flow line before the second valve 47, because the second valve 47 is fully closed. This flow line 53 intersects a third flow line 25 and directs the cold underbody catalyst effluent through a hydrocarbon trap 28. There is a third valve 23 at the intersection of the flow line 53 with the third flow line 25. The third valve 23 is a three-way valve. The three-way valve is in a first position, allowing flow through flow line 53 to the third flow line 25, preventing flow from flow line 21. The hydrocarbon trap 28 produces a cold hydrocarbon trap effluent 31 that flows through a fourth flow line with a fourth valve 35 disposed in this fourth flow line. The fourth valve 35 is fully opened. The fourth flow line is broken up into 3 segments: a first segment exiting the hydrocarbon trap 31, a second segment 33 extending beyond a point of intersection with a sixth flow line up until the fourth valve, and a third segment 38 from the exit of the fourth valve to the ambient environment.

Still referring to FIG. 1, during the second period of time corresponding to the warm engine condition, the control system operates the first valve 18, the second valve 47, the third valve 23, and the fourth valve 35 such that the first valve 18, the second valve 47, and the third valve 23 are partially opened and the fourth valve 35 is closed. The first valve 18 is in a second position to allow emissions from flow line 15 and emissions from flow line 55 to flow through flow line 41 towards the underbody catalyst 43. During the second period of time corresponding to the warm engine condition, the catalyzed exhaust gas 12 exits the close-coupled catalyst 9 and splits between a first flow line 15 and a third flow line 21. The first valve 18 disposed in the first flow line and the third valve 23 disposed in the third flow line are both partially open. The third valve 23 is partially open to allow emissions to flow from flow line 21 through flow line 25 to the hydrocarbon trap 28. The third valve 23 is set in a second position so that flow line 53 is closed off. During the second period of time corresponding to the warm engine conditions, the first valve 18 is partially open such that 50 to 90% of the flow exiting the close-coupled catalyst 9 flows through to the underbody catalyst 43. At this point, the hydrocarbon trap starts to desorb the initially captured unburnt hydrocarbons. Simultaneously, the underbody catalyst 43 has warmed up to the temperature range close to its light-off temperature. A partial flow split is maintained so that the underbody catalyst continues to warm up and eventually achieve light off conditions. The outlet of the underbody catalyst produces a warm underbody catalyst effluent 45 in a second flow line that is then released to the ambient environment by completely opening a second valve 47. The second flow line is broken up into two segments, a first segment 45 before the second valve 47 and a second segment 51 from the exit of the second valve 47 to the ambient environment. The warm underbody catalyst effluent flows through to the ambient environment without any diversions under warm engine conditions, with the second valve opened completely. The third flow line is broken up into two segments: a first segment 21 before the third valve 23 and a second segment 25 after the third valve 23 leading into the hydrocarbon trap 28. During the second period of time corresponding to the warm engine condition, the third valve 23 is open partially such that 50 to 100% of the flow exiting the close-coupled catalyst 9 flows through to the hydrocarbon trap 28. This allows a portion of the catalyzed exhaust gas to flow from the close-coupled catalyst 9 to the hydrocarbon trap 28. The warm hydrocarbon trap effluent from the hydrocarbon trap flows through the fourth flow line. A sixth flow line 55 intersects the warm hydrocarbon trap effluent 31 exiting the hydrocarbon trap 28 at the first valve 18. Downstream from the intersection point on the fourth flow line is a fourth valve 35 that is in a fully closed position. The sixth flow line 55 directs the warm hydrocarbon trap effluent 31 from the hydrocarbon trap to flow into the underbody catalyst 43. This stream combines with the exhaust gases flowing through the flow line 41 before entering the warm underbody catalyst 43, producing an underbody catalyst effluent 45 that passes through the fully opened second valve 47 and exits to the ambient environment 51.

Still referring to FIG. 1, during the third period of time corresponding to the warmer engine condition, the control system operates the first valve 18, the second valve 47, the third valve 23, and the fourth valve 35 such that the fourth valve 35 is fully closed and the second valve 47 is fully opened. The first valve 18 is in a third position where the emissions flow from flow line 55 to flow line 41 to the underbody catalyst 43. The flow of emissions from the engine through flow line 15 is closed off. The third valve 23 is fully open to allow emissions to flow from flow line 21 through flow line 25 to the hydrocarbon trap 28. The third valve 23 is set in a second position so that flow from line 53 is closed off. The catalyzed exhaust gas exits the close-coupled catalyst 9 and flows through the third flow line, through the third valve 23, and into the hydrocarbon trap 28. The warmer hydrocarbon trap effluent 31 exits the hydrocarbon trap 28 and is diverted to the intersecting sixth line 55 to flow through the first valve 18 to feed the warm hydrocarbon trap effluent 31 to the underbody catalyst 43. By this point, the hydrocarbon trap 28 has actively begun to desorb the trapped unburnt hydrocarbons. The underbody catalyst has achieved catalyst light-off with a high conversion efficiency for targeted pollutants. The hydrocarbon trap effluent 31 is fed to the underbody catalyst where the pollutants are converted to complete combustion products before being released. This stream combines with the warm underbody catalyst effluent 45 and exits to the ambient environment 51 through a fully opened second valve 47.

Still referring to FIG. 1, during the fourth period of time corresponding to the hot engine condition, the control system operates the first valve 18, the second valve 47, the third valve 23, and the fourth valve 35 such that the second valve 47 is fully opened and the third valve 23 and the fourth valve 35 are fully closed. The first valve 18 is in the first position, where the emissions flow through the second segment 41 of the first flow line to the underbody catalyst 43. The catalyzed exhaust gas exiting the close-coupled catalyst 9 flows through a first flow line from the close-coupled catalyst 12 to an underbody catalyst 43. The hot underbody catalyst effluent exiting the underbody catalyst travels through a second flow line 45, through a second valve 47, and through a flow line 51 to an ambient environment. The hydrocarbon trap 28 is bypassed entirely. Once the close-coupled catalyst effluent has reached temperatures as high as 350° C., the hydrocarbon trap 28 is bypassed to prevent the deterioration of the zeolites within the hydrocarbon trap 28.

Table 1 below shows a summary of the first, second, third, and fourth periods of time corresponding to the various engine conditions in FIG. 1 as described above. The table indicates the valve position of each of the four valves, the state of the underbody catalyst, the state of the hydrocarbon trap, and the temperature range of the exhaust emissions. When the underbody catalyst state is "inert," the temperature of the exhaust emissions is not high enough to activate the underbody catalyst. When the underbody catalyst state is "active," the underbody catalyst is catalyzing the exhaust emissions. When the hydrocarbon trap is in an "adsorb" state, the hydrocarbon trap is adsorbing hydrocarbons. When the hydrocarbon trap is in a "desorb" state, the hydrocarbons are being desorbed from the hydrocarbon trap. In the table, "UBC" represents underbody catalyst, "HCT" represents hydrocarbon trap, and "CCC" represents close-coupled catalyst (9, FIG. 1).

TABLE 1

|  | Temperature Range | UBC state | HCT state | Valve 18 Position | Valve 47 Position | Valve 23 Position | Valve 35 Position |
|---|---|---|---|---|---|---|---|
| Cold | Below 125° C. | Inert | Adsorb | 100% flow through UBC | 0% open | 100% flow from post UBC to HCT | 100% open |
| Warm | 125-175° C. | Inert | Desorb | Such that 90-50% flow exiting CCC flows towards UBC | 100% open | Such that 10-50% flow exiting CCC flows towards HCT | 0% open |

TABLE 1-continued

| | Temperature Range | UBC state | HCT state | Valve 18 Position | Valve 47 Position | Valve 23 Position | Valve 35 Position |
|---|---|---|---|---|---|---|---|
| Warmer | 175-350° C. | Active | Desorb | Such that 0% flow exiting CCC flows towards UBC | 100% open | Such that 100% flow exiting CCC flows towards HCT | 0% open |
| Hot | Above 350° C. | Active | N/A | Such that 100% flow exiting CCC flows towards UBC | 100% open | Such that 0% flow exiting CCC flows towards HCT | 0% open |

Figure 2:
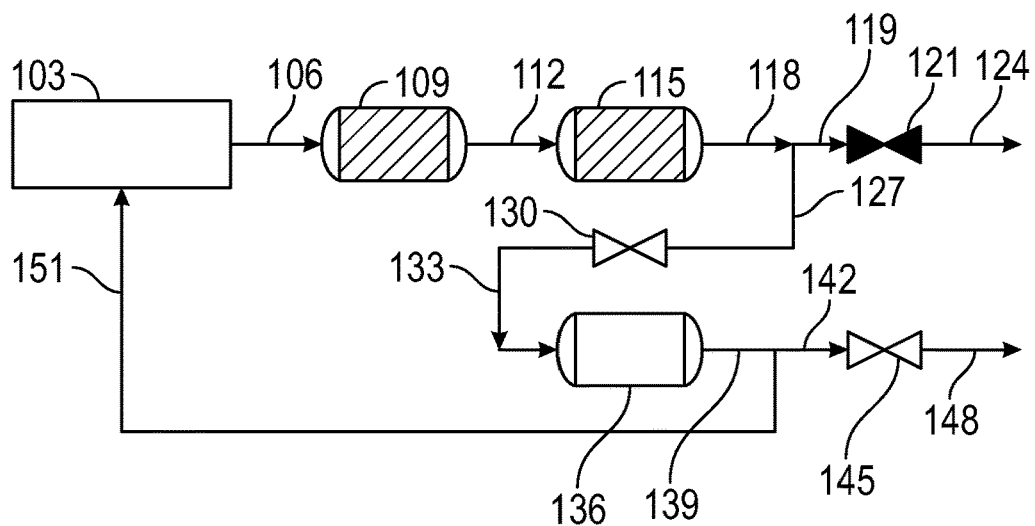
FIG. 2 is a diagram of a three-valve system for reducing emissions from an internal combustion engine having a close-coupled catalyst in accordance with one or more embodiments.
Figure 2:
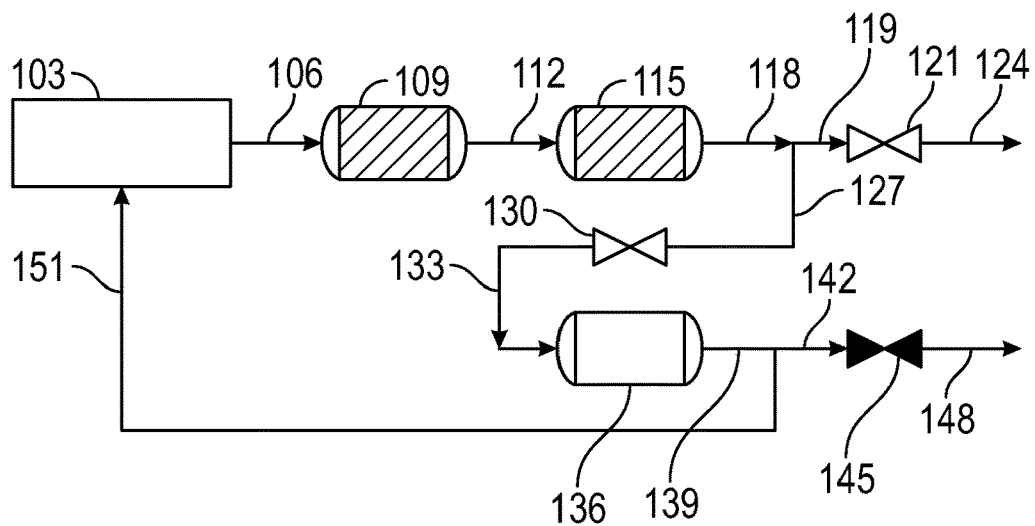
Figure 2:
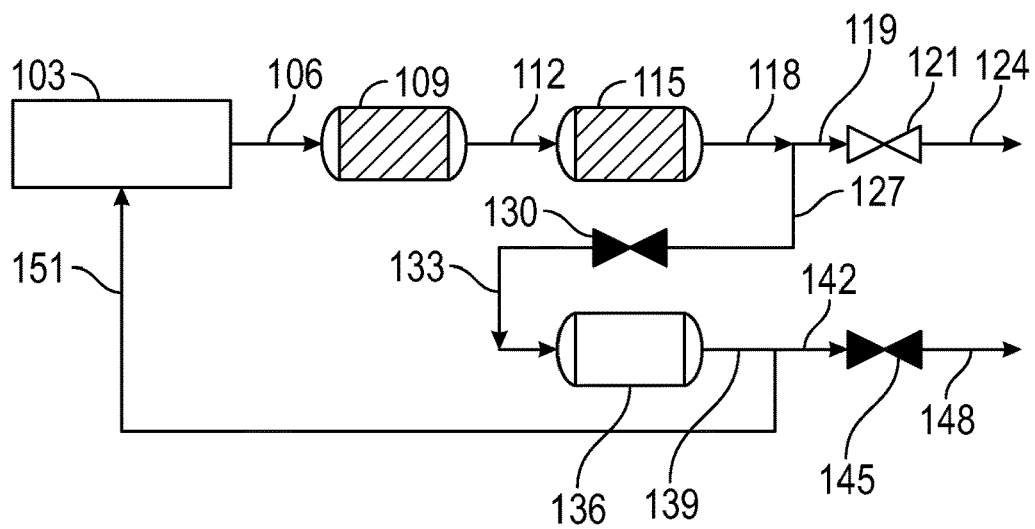

FIG. 2 shows a three-valve system for reducing emissions from an internal combustion engine. The three-valve system may include a close-coupled catalyst 109 receiving a flow line of an exhaust gas 106 from an internal combustion engine 103, producing a catalyzed exhaust gas. The exhaust gas leaving the close-coupled catalyst flows through a first flow line 112 to an underbody catalyst 115, producing an underbody catalyst effluent. The underbody catalyst effluent may flow to the hydrocarbon trap, producing a hydrocarbon trap effluent, or may flow to the ambient environment. The hydrocarbon trap effluent may pass through a heat exchanger, a liquid knockout, or both of these process units downstream of the hydrocarbon trap 136.

Still referring to FIG. 2, the three-valve system may operate during a period of time corresponding to cold, warm, and hot engine conditions. The first period of time corresponding to the cold engine condition refers to the system when the exhaust gas is below 125° C. During the first period of time corresponding to the cold engine condition, the exhaust gas flows through the underbody catalyst and then the hydrocarbon trap to warm the underbody catalyst while the hydrocarbon trap is adsorbing hydrocarbons before the underbody catalyst has reached light-off temperature. The second period of time corresponding to the warm engine condition refers to the system when the exhaust gas is between 125 and 350° C. During the second period of time corresponding to the warm engine condition, a fraction of the total exhaust gas flows from the underbody catalyst to the hydrocarbon trap. The flow exiting the hydrocarbon trap with the desorbed hydrocarbons is rerouted towards the engine for recirculation. The third period of time corresponding to the hot engine condition refers to the system when the exhaust gas is above 350° C. The hot engine condition represents the conventional flow path of a production vehicle by bypassing the hydrocarbon trap once the hydrocarbon trap has fully desorbed the hydrocarbons.

During the first period of time corresponding to the cold engine condition, the control system operates the first valve 121, the second valve 130, and the third valve 145 such that the first valve 121 is closed and the second valve 130 and the third valve 145 are open. The cold underbody catalyst effluent 118 flows through a second flow line from the underbody catalyst 115 to the ambient environment, with a first valve 121 disposed in this second flow line. There is a third flow line 127 intersecting the second flow line to divert the emissions towards the hydrocarbon trap 136. The second flow line is broken into three segments: a first segment 118 exiting the underbody catalyst to the intersection with the third flow line, a second segment 119 from the intersection with the third flow line 127 to the first valve 121, and a third segment 124 from the exit of the first valve 121 to the ambient environment. The third flow line is also divided up into two segments. The first segment 127 intersects the second flow line up until a second valve 130 in the third flow line. The second segment 133 is from the exit of the second valve 130 to the hydrocarbon trap 136. Under a cold engine condition, the cold underbody catalyst effluent flows through the first segment 118 of the second flow line and then is diverted to the third flow line 127 towards the hydrocarbon trap 136. The hydrocarbon trap 136 produces a cold hydrocarbon trap effluent 139 that flows through a fourth flow line to the ambient environment with a third valve 145 disposed in the fourth flow line. The fourth flow line is made up of three segments: the first segment 139 is from the exit of the hydrocarbon trap 136 to an intersection point with a fifth flow line 151, the second segment 142 extends beyond the intersection with the fifth flow line 151 to the third valve 145, and the third segment 148 extends from the exit of the third valve 145 to the ambient environment. Under a cold engine condition, the cold hydrocarbon trap effluent exits the hydrocarbon trap 136 and flows through the fourth flow line to the ambient environment 148 without flowing through the fifth flow line 151.

Still referring to FIG. 2, during the second period of time corresponding to the warm engine condition, the control system operates the first valve 121, the second valve 130, and the third valve 145 such that the first valve 121 is open, the second valve 130 is partially open, and the third valve 145 is closed. The second valve is partially opened such that 5 to 25% of the exhaust flow is fed back to the engine as exhaust gas recirculation. For example, the second valve may be opened in an amount with a lower limit of any of 1, 2, 3, 4, and 5% and an upper limit of any of 20, 21, 22, 23, 24, and 25%, where any lower limit may be paired with any mathematically compatible upper limit. Engine 103 may include an exhaust gas recirculation valve to allow for exhaust gas to recirculate at the air inlet (not illustrated). During the second period of time corresponding to the warm engine condition, the warm underbody catalyst effluent flows from the underbody catalyst 115 and splits between the second flow line and the third flow line. A first portion of the warm underbody catalyst 115 effluent flows to the ambient environment through the second flow line. A second portion flows through the third flow line to the hydrocarbon trap 136. The hydrocarbon trap 136 produces a warm hydrocarbon trap effluent 139. During the second period of time corresponding to the warm engine condition, the third valve 145 is closed to prevent desorbed hydrocarbons escaping into the atmosphere through the tailpipe, causing a diversion of the warm hydrocarbon trap effluent through the fifth flow line 151 back to the engine 103.

Still referring to FIG. 2, during the third period of time corresponding to the hot engine condition, the control system operates the first valve 121, the second valve 130, and the third valve 145 such that the first valve 121 is open and the second valve 130 and the third valve 145 are closed. The hot underbody catalyst effluent flows from the underbody catalyst 115 to the ambient environment through the second flow line through a fully opened first valve 121.

Figure 3:
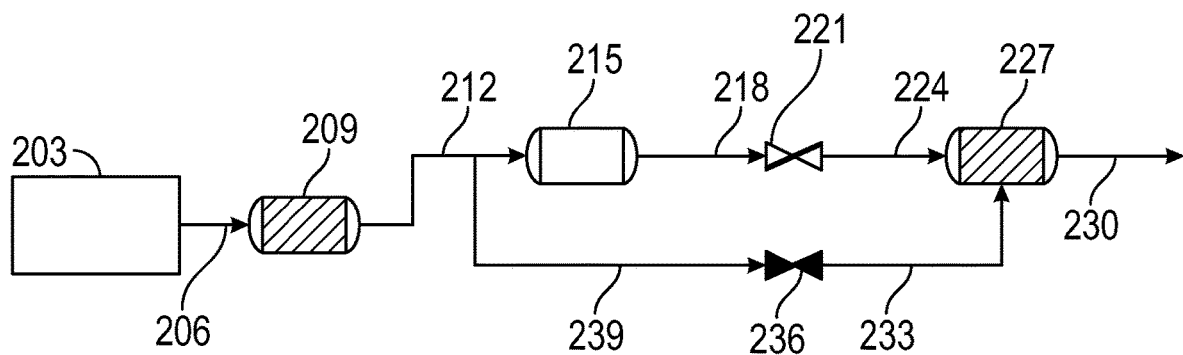
FIG. 3 is a diagram of a two-valve of a system for reducing emissions from an internal combustion engine having a close-coupled catalyst in accordance with one or more embodiments.
Figure 3:
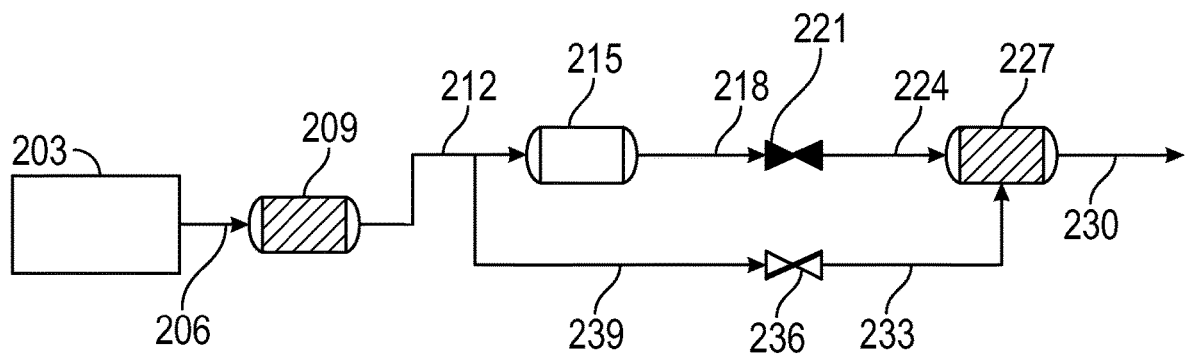

FIG. 3 shows a two-valve system for reducing emissions from an internal combustion engine. The two-valve system may include a close-coupled catalyst 209 receiving a flow line of exhaust gas 206 from an internal combustion engine 203, producing a catalyzed exhaust gas. The catalyzed exhaust gas may flow to the hydrocarbon trap before flowing to the underbody catalyst, or the catalyzed exhaust gas may flow to the underbody catalyst directly. The hydrocarbon trap effluent may pass through a heat exchanger, a liquid knockout, or both of these process units downstream of the hydrocarbon trap 215.

The two-valve system may operate during a period of time corresponding to a flow through and a bypass condition. The first period of time corresponding to the flow through condition refers to the system when the exhaust gas is below 125° C. During the first period of time corresponding to the flow through condition, the exhaust gas flows through the hydrocarbon trap to capture hydrocarbons during the cold start phase. This condition is also used for regenerating the hydrocarbon trap. The second period of time corresponding to the bypass condition refers to the system when the exhaust gas is between 125 and 350° C. During the second period of time corresponding to the bypass condition, the exhaust gas bypasses the hydrocarbon trap to warm up the underbody catalyst and prevent the hydrocarbon trap from desorbing hydrocarbons before the underbody catalyst has reached light-off temperature. During the third period of time, flow is switched back to the flow through condition such that the exhaust gases pass through the hydrocarbon trap before entering the underbody catalyst. This enables the hydrocarbon trap to be regenerated for the next cold start. The third period of time corresponding to the flow through condition refers to when the combustion gas is above 350° C.

During the first period of time corresponding to the flow through condition, the control system operates the first valve 221 and the second valve 236 such that the first valve 221 is open and the second valve 236 is closed. During the first period of time corresponding to the flow through condition, the catalyzed exhaust gas leaving the close-coupled catalyst 209 flows through a first flow line 212 to a hydrocarbon trap 215, producing a hydrocarbon trap effluent. The hydrocarbon trap effluent may flow through a heat exchanger, a liquid knockout, or both. The hydrocarbon trap effluent flows through a second flow line broken into two segments: a first segment 218 from the exit of the hydrocarbon trap 215 to the first valve 221 in the second flow line, and a second segment 224 from the exit of the first valve 221 to the underbody catalyst 227. Under the flow through condition, the hydrocarbon trap effluent flows through a second flow line to the underbody catalyst 227. The underbody catalyst 227 produces an underbody catalyst effluent that flows through a fourth flow line 230 to the ambient environment. This is the same flow path used during the third period of time for the hydrocarbon trap regeneration.

During the second period of time corresponding to the bypass condition, the control system operates the first valve 221 and the second valve 236 such that the first valve 221 is closed and the second valve 236 is open. During the first period of time corresponding to the bypass condition, the dry exhaust gas in the first flow line 212 exiting the liquid knockout which is downstream of the close-coupled catalyst 209 is diverted by a third flow line intersecting the first flow line 212. The third flow line contains a second valve 236 and is broken into two segments. There is a first segment 239 from the intersection point of the first flow line to the second valve 236. There is a second segment 233 from the second valve 236 to the underbody catalyst 227. In the bypass condition, the first valve 221 is closed and the second valve 236 is fully opened. Once the dry exhaust gas reaches the underbody catalyst 227, the underbody catalyst 227 produces an underbody catalyst effluent that is directed to the ambient environment through the fourth flow line 230.

Figure 4:
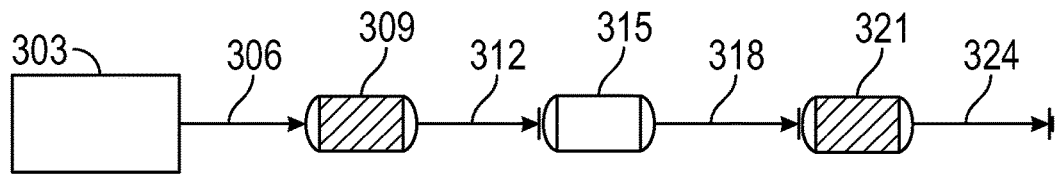
FIG. 4 is a diagram of a valve-less system for reducing emissions from an internal combustion engine having a close-coupled catalyst in accordance with one or more embodiments.

FIG. 4 shows a valve-less system for reducing emissions from an internal combustion engine. The valve-less system may include a close-coupled catalyst 309 receiving a flow line of exhaust gas 306 from an internal combustion engine 303. The close-coupled catalyst produces a catalyzed exhaust gas that travels through the first flow line 312 to the hydrocarbon trap 315. The hydrocarbon trap produces a hydrocarbon trap effluent that travels through a second flow line 318 to the electrically-heated catalyst 321. The hydrocarbon trap effluent may pass through a heat exchanger, a liquid knockout, or both of these process units downstream of the hydrocarbon trap 315. The electrically-heated catalyst 321 produces an electrically-heated catalyst effluent traveling to the ambient environment through a third flow line 324. The electrically-heated catalyst effluent is called an activated electrically-heated catalyst effluent when the heating elements of the electrically-heated catalyst are activated. The electrically-heated catalyst effluent is called an inactivated electrically-heated catalyst effluent when the heating elements of the electrically-heated catalyst are inactivated.

The valve-less system may operate during a period of time corresponding to cold and warm engine conditions. The first period of time corresponding to a cold engine condition refers to the system when the exhaust gas at the underbody catalyst is below 350° C. The second period of time corresponding to a warm engine condition refers to the system when the exhaust gas is below 350° C. During the first period of time corresponding to the cold engine condition, the electrical heating elements attached to the electrically-heated catalyst are activated. During the second period of time corresponding to the warm engine condition, the electrical heating elements attached to the electrically-heated catalyst are deactivated and exhaust gas flows through the process unit in the absence of an external heat source. The external heat source may be the electrical heating elements of the catalyst unit.

The hydrocarbon trap may be composed of Zeolites or any other known material to adsorb hydrocarbons and CO, $NO_x$, emissions in exhaust gas. Such materials may be suitable as they adsorb hydrocarbons at colder temperatures and desorb the hydrocarbons at temperatures above approximately 125° C. Zeolites are known to lose stability at high temperatures.

The catalyst used in the underbody catalyst and the electrically-heated catalyst may include a monolith made of ceramic which is coated with a wash coat made of silica or alumina. The wash coat may also contain ceria for oxygen storage and platinum group metals such as platinum, rhodium, or palladium.

The heat exchanger used may be a counter flow heat exchanger. The heat exchanger may be an air-to-air heat exchanger. The heat exchanger may be a plate style that will cool the exhaust emissions using ambient air.

Embodiments of the present disclosure may provide at least one of the following advantages. All of the systems have a separate secondary catalyst unit from the hydrocarbon trap. By keeping these units separate, this prevents accidental desorption of adsorbed hydrocarbons prior to oxidation. By de-coupling the adsorption and catalysis, there is greater flexibility with respect to placement of the hydrocarbon trap and the catalyst allowing for various potential system configurations. Because of the instability of zeolites at high temperatures, de-coupling the hydrocarbon trap and the catalyst allows the hydrocarbon trap to be bypassed during warmer and hotter conditions, to prevent degradation of the zeolites while continuing to treat the exhaust gas with the underbody catalyst.

Case Study

An experiment utilized an automobile under the Federal Test Procedure 75 (FTP-75) to assess emissions in three configurations. The first configuration had two catalyst units and no hydrocarbon trap. The second configuration had a passive hydrocarbon trap. The third configuration had an active hydrocarbon trap, which is representative of the system configurations described herein. The results are shown in Table 2 below, and confirm that the active hydrocarbon trap reduces emissions more effectively than a passive hydrocarbon trap or in the absence of a hydrocarbon trap altogether.

TABLE 2

|  | Cumulative Tailpipe HC emissions for FTP75 test(g) | % Reduction compared to baseline |
|---|---|---|
| No Trap (Dual Catalyst) (Experimental) | 0.753 | 0.00% |
| Passive Hydrocarbon Trap (Predicted) | 0.573 | 23.90% |
| Active Hydrocarbon Trap (Predicted) | 0.240 | 68.12% |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A device for reducing emissions from an internal combustion engine having a close-coupled catalyst, the device comprising:
   an underbody catalyst disposed downstream of the close-coupled catalyst;
   a hydrocarbon trap disposed downstream of the close-coupled catalyst; and
   a four-valve system configured to dynamically adjust a flow path of exhaust from the internal combustion engine through the underbody catalyst, the hydrocarbon trap, or both, to reduce emissions, comprising:
   a first flow line from the close-coupled catalyst to the underbody catalyst with a first valve disposed at an intersection of the first flow line and a sixth flow line;
   a second flow line from the underbody catalyst to an ambient environment with a second valve disposed in the second flow line;
   a third flow line from the close-coupled catalyst to the hydrocarbon trap with a third valve disposed at an intersection of the third flow line and a fifth flow line;
   a fourth flow line from the hydrocarbon trap to the ambient environment with a fourth valve disposed in the fourth line;
   the fifth flow line from the underbody catalyst upstream of the second valve to the hydrocarbon trap flowing through the third valve;
   the sixth flow line from the hydrocarbon trap upstream of the fourth valve to the underbody catalyst flowing through the first valve; and
   a control system, configured to:
   during a first period of time corresponding to a cold engine condition:
   position the first valve and the third valve each in a first position;
   close the second valve;
   open the fourth valve;
   flow the catalyzed exhaust gas through the underbody catalyst, to produce a cold underbody catalyst effluent;
   flow the cold underbody catalyst effluent from the underbody catalyst to the hydrocarbon trap, to produce a cold hydrocarbon trap effluent; and
   eject the cold hydrocarbon trap effluent to an ambient environment.

2. The device of claim 1, wherein the control system is configured such that the first valve is in a second position, the second valve is partially open, the third valve is in a second position, and the fourth valve is closed during a second period of time corresponding to a warm engine condition.

3. The device of claim 2, wherein when the first valve is in the second position, the flow path of exhaust flows through the first flow line and the sixth flow line to the underbody catalyst.

4. The device of claim 2, wherein when the third valve is in the second position, the flow path of exhaust flows through the third flow line to the hydrocarbon trap.

5. The device of claim 1, wherein the control system is configured such that the first valve is in a third position, the second valve is open, the third valve is in the second position, and the fourth valve is closed during a third period of time corresponding to a warmer engine condition.

6. The device of claim 5, wherein when the first valve is in the third position, the flow path of exhaust flows through the sixth flow line to the underbody catalyst.

7. The device of claim 1, wherein the control system is configured such that the first valve is in the first position, the second valve is open, and the third valve and the fourth valve are closed during a fourth period of time corresponding to a hot engine condition.

8. The device of claim 1, wherein when the first valve is in the first position, the flow path of exhaust flows through the first flow line to the underbody catalyst.

9. The device of claim 1, wherein when the third valve is in the first position, the flow path of exhaust flows through the fifth flow line to the hydrocarbon trap.

10. The device of claim 1, wherein the underbody catalyst is separate from the hydrocarbon trap.

11. The device of claim 1, wherein the hydrocarbon trap contains a sorbent material comprising a zeolite or an activated carbon.

12. The device of claim 11, wherein the sorbent material is pelletized or wash-coated onto a honeycomb-like structure.

13. A method for reducing emissions from an internal combustion engine having a close-coupled catalyst, using a system comprising:
- an underbody catalyst disposed downstream of the close-coupled catalyst;
- a hydrocarbon trap disposed downstream of the close-coupled catalyst; and
- a four-valve system configured to dynamically adjust a flow path of exhaust from the internal combustion engine through the underbody catalyst, the hydrocarbon trap, or both, to reduce emissions, wherein the four-valve system comprises:
  - a first flow line from a close-coupled catalyst to the underbody catalyst with a first valve disposed in the first flow line;
  - a second flow line from the underbody catalyst to an ambient environment with a second valve disposed in the second flow line;
  - a third flow line from the close-coupled catalyst to the hydrocarbon trap with a third valve disposed in the third flow line;
  - a fourth flow line from the hydrocarbon trap to the ambient environment with a fourth valve disposed in the fourth line;
  - a fifth flow line from the underbody catalyst upstream of the second valve to the hydrocarbon trap downstream of the third valve; and
  - a sixth flow line from the hydrocarbon trap upstream of the fourth valve to the underbody catalyst downstream of the first valve;

the method comprising:
- feeding an exhaust gas from the internal combustion engine to the close-coupled catalyst, producing a catalyzed exhaust gas;
  - flowing the catalyzed exhaust gas from the close-coupled catalyst to the four- valve system; and
  - during a first period of time corresponding to a cold engine condition:
    - opening the first valve and fourth valve;
    - closing the second valve and third valve;
    - flowing the catalyzed exhaust gas through the underbody catalyst, producing a cold underbody catalyst effluent;
    - flowing the cold underbody catalyst effluent from the underbody catalyst to the hydrocarbon trap, producing a cold hydrocarbon trap effluent; and
    - ejecting the cold hydrocarbon trap effluent to an ambient environment.

14. The method of claim 13, further comprising:
during a second period of time corresponding to a warm engine condition:
- partially closing the first valve;
- partially opening the second valve and the third valve;
- closing the fourth valve;
- flowing a first portion of the catalyzed exhaust gas to the underbody catalyst through the first valve, producing a warm underbody catalyst effluent; flowing a second portion of the catalyzed exhaust gas to the hydrocarbon trap through the third valve, producing a warm hydrocarbon trap effluent;
- flowing the warm hydrocarbon trap effluent to the underbody catalyst, producing additional warm underbody catalyst effluent; and
- ejecting the warm underbody catalyst effluent to the ambient environment through the second valve.

15. The method of claim 14, further comprising:
during a third period of time corresponding to a warmer engine condition:
- closing the first valve and the fourth valve;
- opening the second valve and the third valve;
- flowing the catalyzed exhaust gas from the close-coupled catalyst to the hydrocarbon trap through the third valve, producing a warmer hydrocarbon trap effluent;
- flowing the warmer hydrocarbon trap effluent to the underbody catalyst, producing a warmer underbody catalyst effluent; and
- ejecting the warmer underbody catalyst effluent to the ambient environment through the second valve.

16. The method of claim 15, hot engine condition further comprising:
during a fourth period of time corresponding to a hot engine condition:
- opening the first valve;
- closing the third valve;
- flowing the catalyzed exhaust gas from the close-coupled catalyst to the underbody catalyst through the first valve, producing a hot underbody catalyst effluent; and
- ejecting the hot underbody catalyst effluent to the ambient environment through the second valve.

17. The method of claim 13, wherein the exhaust gas has a temperature below 125° C. during the first period of time corresponding to the cold engine condition.

18. The method of claim 14, wherein the exhaust gas has a temperature in the range of 125 to 175° C. during the second period of time corresponding to the warm engine condition.

19. The method of claim 15, wherein the exhaust gas has a temperature in the range of 175 to 350° C. during the third period of time corresponding to the warmer engine condition.

20. The method of claim 16, wherein the exhaust gas has a temperature in the range of above 350° C. during the fourth period of time corresponding to the hot engine condition.

* * * * *